Jan. 31, 1967 W. T. DONOFRIO 3,300,886
FILMSTRIP HOLDER
Filed June 21, 1965 2 Sheets-Sheet 1
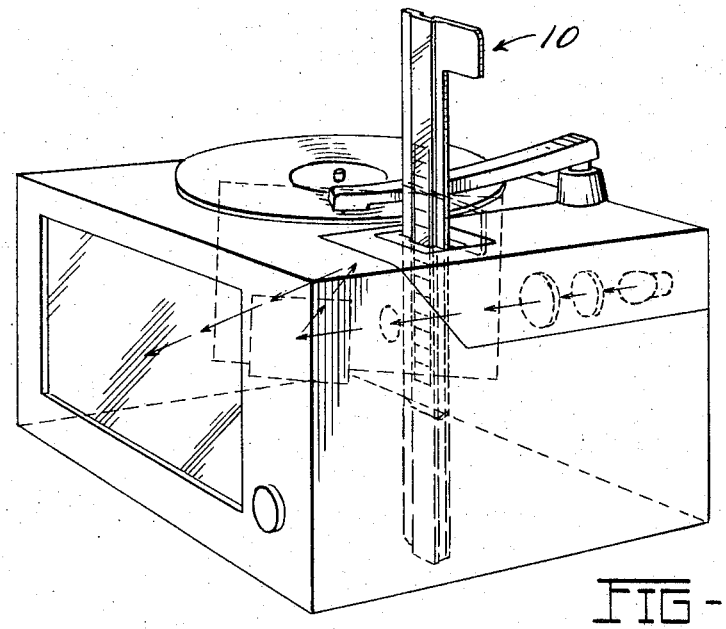
FIG-1-
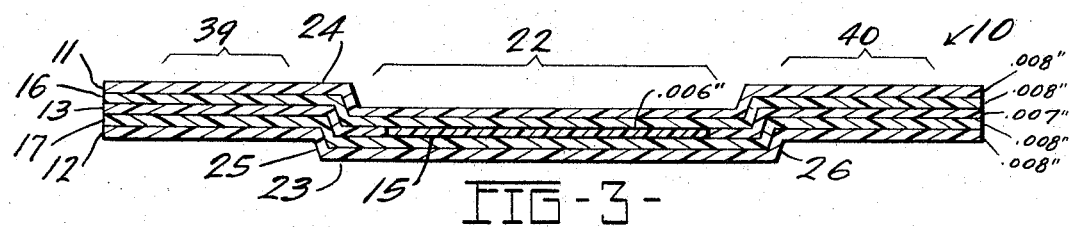
FIG-3-
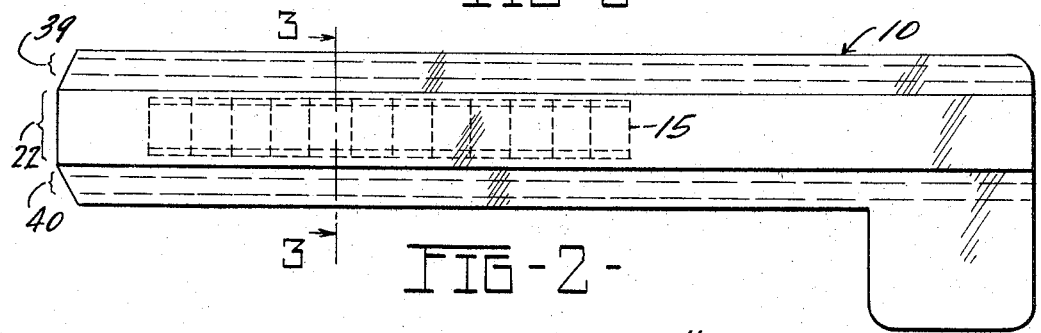
FIG-2-
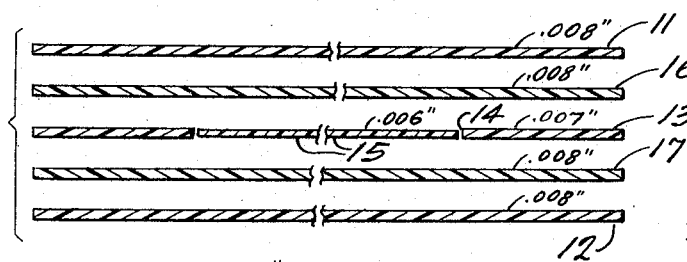
FIG-4-
INVENTOR:
WILLIAM T. DONOFRIO.
BY
Owen & Owen
ATT'YS.

Jan. 31, 1967  W. T. DONOFRIO  3,300,886
FILMSTRIP HOLDER
Filed June 21, 1965  2 Sheets-Sheet 2
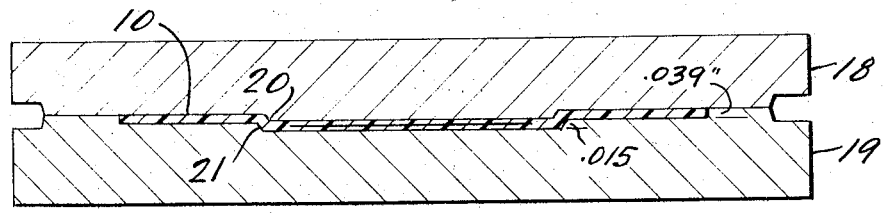
FIG-5-
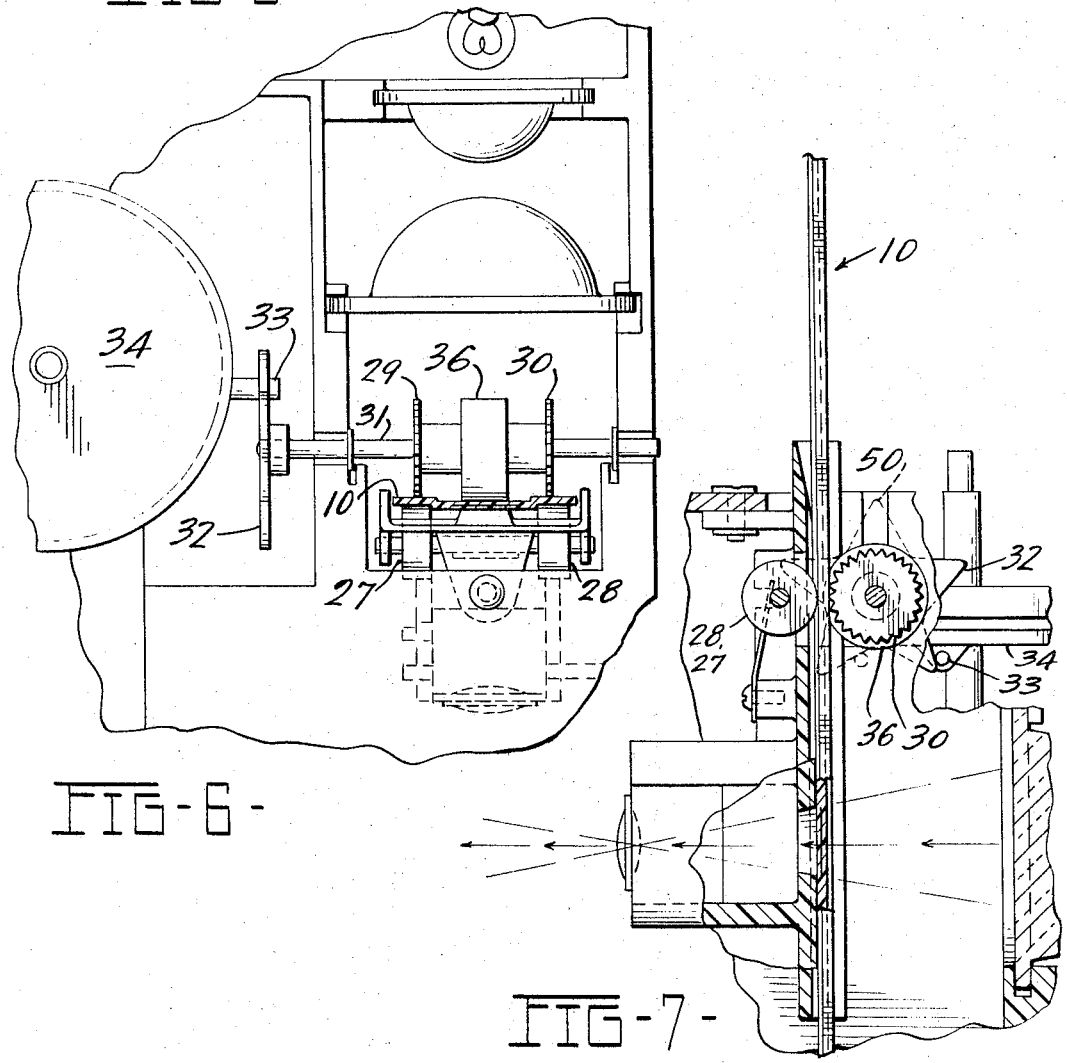
FIG-6-
FIG-7-
INVENTOR:
WILLIAM T. DONOFRIO.
BY Owen + Owen
ATT'YS.

United States Patent Office 3,300,886
Patented Jan. 31, 1967

3,300,886
FILMSTRIP HOLDER
William T. Donofrio, Toledo, Ohio, assignor to Dodge Audio-Visual Corporation, Toledo, Ohio, a corporation of Ohio
Filed June 21, 1965, Ser. No. 465,366
6 Claims. (Cl. 40—152)

This invention relates to a filmstrip holder designed to facilitate the handling and feeding of multiframe film strips and to afford protection for the image bearing strips of film from moisture, dust and fingerprint damage, etc. More particularly, this invention relates to a filmstrip holder for multiple frame strips which is comprised of a plurality of layers of laminated sheets of relatively thin sheet material, which, when laminated, will provide sufficient rigidity for use in commercially available visual projection apparatuses.

In the embodiment described below, the film strip is illustrated as being of the type associated with machines which will serially pass a filmstrip past the optical axis of a projection system in coordination with auditory material being played on a phonograph record. It has been found that the filmstrip of this invention is particularly useful in the type of machine in which a driven roller or other friction member provides the motive force for the filmstrip and the filmstrip itself does not have teeth or other projections for engagement with a gear or lever.

Previous efforts to provide a film strip holder comprised of laminated layers of relatively thin sheet material, such as polyvinylchloride, have been unsuccessful due to the fact that, because the filmstrip holder necessarily must have sufficient rigidity to retain its linear shape within the projection apparatus, the sheet materials used were necessarily relatively rigid. When such rigid filmstrip holders are used with the type of projection mechanism previously described in which one or more rollers frictionally engage one side of the filmstrip to push it through the machine, it was found, due to the rigidity and hardness of the engaging surface of the filmstrip holder, that the engagement between that surface and the drive roller was insufficient to position the filmstrip properly and often the filmstrip slipped or otherwise malfunctioned.

In addition to this, it was found that in order to provide a sufficient thickness for a filmstrip holder to be used in existing machines, it was necessary to laminate as many as nine or ten layers of commercially available sheet materials, such as polyvinylchloride, in order to correctly position the filmstrip itself before the projection lens and to provide sufficient holder thickness between the drive rollers and the backup rollers in existing machines. A laminated filmstrip which includes as many as nine or ten layers of thermoplastic sheet material could not be economically substituted for the prior art filmstrip holders having a cardboard frame or covering for which the machines were originally designed.

It has been discovered that through use of different grades of certain sheet materials such as polyvinylchloride, that a filmstrip holder of sufficient rigidity and also with surface characteristics which provide a sufficient frictional engagement with the drive rollers of the projection machines can be laminated. It has also been discovered that through use of an offset molding press which is used to make a permanent indentation or channel in the laminated filmstrip holder, that sufficient thickness can be provided in a laminated filmstrip holder having as few as five sheets of commercially available thermoplastic material.

Accordingly, it is an object of this invention to provide a filmstrip holder for elongate multi-frame filmstrips which is comprised of a plurality of laminated layers of precut sheet material in which the outer, surface layers are of a relatively flexible material and the intermediate and central layers are comprised of a relatively rigid material.

It is another object of this invention to provide a filmstrip holder comprised of laminated layers of sheet material which includes an offset or depressed central channel which effectively increases the width of the filmstrip holder and adds structural rigidity thereto.

Other objects and advantages of the invention will be apparent from the following detailed description of a preferred embodiment thereof, reference being made to the accompanying drawings, in which:

FIGURE 1 is a simplified view in perspective of a coordinated sound and sight reproducing apparatus and showing the laminated elongated filmstrip holder of this invention as it is used in the apparatus;

FIGURE 2 is a plan view of the laminated filmstrip holder of this invention, illustrating how the filmstrip is positioned within the compressed central channel;

FIGURE 3 is a cross-sectional view, shown on a greatly enlarged scale, taken along line 3—3 of FIGURE 2 and showing the various layers of plastic sheet material which comprise the filmstrip holder;

FIGURE 4 is an expanded, diagrammatic view showing the various layers of plastic material and the filmstrip positioned within a cutout portion of the central layer prior to the lamination step;

FIGURE 5 is a cross-sectional view schematically illustrating the method of laminating, by means of a pair of formed pressure plates, the plurality of sheets of plastic material illustrated in FIGURE 4;

FIGURE 6 is a plan view of the drive mechanism of the apparatus shown in FIGURE 1 and illustrating the manner in which the drive rollers engage the filmstrip of this invention; and FIGURE 7 is a view in elevation of the drive apparatus shown in FIGURE 6, showing engagement of the drive rollers and backup roller with the filmstrip of this invention.

The filmstrip holder of this invention, generally indicated by reference numeral 10, is designed to be inserted in a film receiving slot of the reproducing apparatus as shown in FIGURE 1. This apparatus includes rotary drive means for serially passing the film frames past a projection system which projects the image on a front screen in the apparatus case.

Referring to FIGURES 2, 3, and 4, the filmstrip holder 10 is comprised of five separate layers of a sheet material which are laminated together in a formed press, which will be subsequently explained.

In the preferred embodiment herein described, the sheet material is a suitable thermoplastic material, such as polyvinylchloride, which is commercially available in various grades of varying rigidity and which is well suited for lamination in a heated press.

As best seen in FIGURE 4, the outer layers 11 and 12 are comprised of a relatively flexible thermoplastic sheet material which has been cut to have the general outline of the filmstrip holder as shown in FIGURE 2. A central layer 13 is comprised of a relatively rigid thermoplastic material which has been cut to the general outline of the film holder as shown in FIGURE 2 and which has an additional central aperture 14 for receiving the filmstrip 15. The central aperture 14 is of the same shape as the filmstrip 15 inserted therein and the thickness of the central layer 13 is selected so that it is substantially the same or slightly larger than the thickness of the filmstrip 15 so that when the composite layers are laminated, no undue stresses which might cause warping, etc. of the filmstrip 15 are exerted upon it.

In the preferred embodiment illustrated in FIGURE 4, the thickness of the central layer 13 is 0.007 inch while the thickness of commercially available filmstrips is 0.006 inch. In this illustration, the thickness of the outer layers 11 and 12 is 0.008 inch. Between the filmstrip 15 and central layer 13 and the two outer layers 11 and 12, are intermediate layers 16 and 17. These intermediate layers 16 and 17 are comprised of relatively rigid thermoplastic sheet material and are also 0.008 inch in thickness, prior to lamination.

Because the image from the filmstrip 15 must be projected through the outer layers 11 and 12 and intermediate layers 16 and 17, these layers must necessarily be comprised of a transparent, colorless material. The central layer 13, because the filmstrip 15 fits within it, need not be transparent and may preferably be translucent or opaque. Various colors may be used for the central layer 13 to designate the subject matter of the filmstrip 15 embedded therein and additional printing or advertising matter may be included thereon.

When the various layers 11, 12, 13, 16 and 17 and the filmstrip 15 have been assembled in the manner previously described, they are placed within a laminating press comprised of a pair of polished plates 18 and 19, as shown in FIGURE 5. These plates 18 and 19 have a complementary shaped projection 20 and indentation 21 positioned centrally of the position of the various layers of the filmstrip so that the laminated filmstrip holder 10, after being pressed by the plates 18 and 19, will have an offset or indented central channel 22 extending along its length and containing the filmstrip 15, as best seen in FIGURES 2 and 3. The purpose of the offset or indented channel 22, as previous explained, is to provide additional depth or effective thickness from its lower outer surface 23 as illustrated in FIGURE 3 to the upper outer surface 24 as illustrated in that figure. The channel 22 also provides increased structural strength and resistance to bending.

When the various layers of the laminated strip are comprised of thermoplastic sheet material of the thicknesses previously described, the total thickness of the filmstrip holder, prior to lamination, is 0.039 inch. In this preferred embodiment, the projection and indentation 21 in the pressed plates 18 and 19 are such that the depth of the central channel 22, and thus the amount of extension of the thickness of the filmstrip, is 0.15 inch, making a total of 0.054 inch effective thickness. As previously described, this thickness is suitable for operation in existing projection apparatuses which were designed for use with substantially thicker cardboard filmstrip holders. The edges of the central channel 22 projecting on the lower outer surface 23 of the filmstrip, designated by reference numerals 25 and 26 in FIGURE 3, also serve to position and guide the filmstrip in a straight path through the projection machine as will be described below. Thus, the laminated filmstrip holder 10 of this invention provides a rigid, elongate filmstrip holder, having surfaces which will satisfactorily engage the drive rollers of the projection apparatus, due to the flexible characteristics of the outer layers 11 and 12, and which is sufficiently thick to be used in machines designed for cardboard filmstrip holders.

Referring to a plan view of the drive mechanism of such a machine as shown in FIGURE 6, the filmstrip 10 is inserted into a guide channel which includes a pair of projecting shoulders 27 and 28 and a pair of feed rollers or sprockets 29 and 30 which are secured to a drive shaft 31. The starwheel 32 is secured to one end of the drive shaft 31 and is turned by a pawl 33 mounted on the periphery of a wheel 34 which is driven in synchronization with the phonograph turntable. When the pawl 33 engages one of the projections 35 on the starwheel 32 as best seen in FIGURE 7, the drive rollers or sprockets 29 and 30 are rotated an amount sufficient to move the film strip holder 10 downwardly past the projection system a distance equal to the width of one of the frames of the filmstrip 15. As shown in FIGURES 6 and 7, the peripheries of the sprockets 29 and 30 may be serrated or otherwise embossed to increase or make more positive the engagement with the relatively flexible and resilient outer surface of the filmstrip holder 10. A guide wheel 36 is positioned between the drive sprockets 29 and 30 to keep the central portion of the filmstrip holder 10 including the edges 25 and 26 of the central channel 22 on the lower surface of the filmstrip holder 10 pressed between the shoulders 27 and 28 of the guide channel. A pair of pressure rollers 37 and 38 are positioned on the opposite side of the filmstrip holder 10 from the drive sprockets 28 and 29 to insure uniform pressure against the drive sprockets 29 and 30.

To further insure satisfactory frictional engagement between the drive sprockets 29 and 30 and the upper surfaces of the filmstrip holder 10, as designated in FIGURE 3 by reference numerals 39 and 40, it may be desirable to emboss, knurl or otherwise roughen the surfaces 39 and 40 which engage the drive sprockets 29 and 30. This can be done by means of an embossing roller or wheel (not shown) after the filmstrip holder 10 has been laminated as previously described. Such an embossed or roughened surface would appear on the upper surface of the filmstrip holder 10 as schematically illustrated in FIGURE 2.

It will be apparent to those skilled in the art that the selection of the various grades of thermoplastic materials such as polyvinylchloride, may be varied to suit individual applications so that the required rigidity of the filmstrip and the necessary flexibility of its outer surface can be maintained to suit various types of filmstrip and drive mechanisms. Other modifications of the above-described preferred embodiment of the invention will be apparent to those skilled in the art and it is to be understood that such modifications can be made without departing from the scope of the invention, if within the spirit and tenor of the accompanying claims.

What I claim is:

1. An elongate holder for a transparent filmstrip comprising, in combination, a central layer of sheet material with a portion cut away to receive a filmstrip, a filmstrip in the recess provided by said cut away portion, intermediate layers on each side of said central layer comprised of a transparent sheet of a relatively rigid material, and an outer layer adjacent each of said intermediate layers, said outer layer being comprised of a transparent sheet of a relatively flexible material, said central, intermediate and outer layers of material being sealed to one another at their adjacent surfaces to form a laminated, elongate filmstrip holder with a central portion extending lengthwise of said holder and displaced from the plane of the remainder of said holder to form a central channel extending lengthwise of said holder with said filmstrip positioned in said central channel.

2. The elongate holder of claim 1 wherein said sheet comprising said central layer and said filmstrip are of substantially the same thickness.

3. The elongate holder of claim 1 wherein said central layer is comprised of an opaque sheet.

4. The elongate holder of claim 1 wherein said central intermediate and outer layers are thermally sealed to one another to form said laminated filmstrip holder.

5. The elongate holder of claim 1 in which an outer margin adjacent said central channel is embossed.

6. A method of forming an elongate film holder for a filmstrip comprising the steps of assembling a first sheet of a thermoplastic material with a film receiving aperture therein and a filmstrip within said aperture, an intermediate sheet of a transparent, thermoplastic material on each side of said first sheet and an outer sheet of a relatively flexible thermoplastic material adjacent each of said intermediate sheets to form a composite, generally planar stack of layers of thermoplastic material with the filmstrip centered therein and pressing said stack in a heated forming press whereby said sheets and filmstrip are heat sealed to one another to form an elongate, laminar filmstrip holder with a central portion recessed below the plane of the edges of said holder, said central portion extending lengthwise of said holder with said filmstrip positioned therein.

References Cited by the Examiner

UNITED STATES PATENTS

| | | | |
|---|---|---|---|
| 2,277,969 | 3/1942 | Grant | 40—64 |
| 2,643,577 | 6/1953 | Williams | 40—64 |
| 3,253,359 | 5/1966 | Offensend | 40—64 |

EUGENE R. CAPOZIO, *Primary Examiner.*

W. J. CONTRERAS, *Assistant Examiner.*